United States Patent [19]
Ishihara et al.

[11] Patent Number: 4,492,725
[45] Date of Patent: Jan. 8, 1985

[54] COMPOSITE THERMAL INSULATOR

[75] Inventors: Shoichi Ishihara, Katano; Hiroshi Yoneno, Nara; Ryoichi Yamamoto, Neyagawa, all of Japan

[73] Assignee: Matsushita Electric Industrial Co., Ltd., Osaka, Japan

[21] Appl. No.: 514,980

[22] Filed: Jul. 18, 1983

[30] Foreign Application Priority Data

Jul. 20, 1982 [JP] Japan .................. 57-126910
Dec. 16, 1982 [JP] Japan .................. 57-221404

[51] Int. Cl.$^3$ ........................... B32B 5/16; B32B 5/18
[52] U.S. Cl. ......................................... 428/69; 428/76; 428/323; 428/402; 428/403
[58] Field of Search ............... 428/68, 69, 71, 76, 428/408, 403, 402, 323

[56] References Cited

U.S. PATENT DOCUMENTS 3,264,165  8/1966  Stickel ........................... 428/69
3,850,714  11/1974 Adorjan ......................... 428/69 X Primary Examiner—Alexander Thomas
Attorney, Agent, or Firm—Birch, Stewart, Kolasch & Birch

[57] ABSTRACT

The disclosure is directed to a composite thermal insulator including a Freon gas expanded plastic, and an evacuated powder insulation. The present invention provides a composite thermal insulator light in weight and having a superior heat insulating performance over a long period through replacement of a thick metallic container conventionally used for the evacuated powder insulation and considered indispensable for withstanding a load at one atmospheric pressure and for preventing vacuum leakage, by a film-like plastic container, with activated carbon disposed in it.

More specifically, the composite thermal insulator of the present invention includes a Freon gas expanded plastic, a film-like plastic container evacuated to form a vacuum in its interior, and directly contacting and/or covered by the expanded plastic, and activated carbon or inorganic powder containing activated carbon tightly enclosed in the plastic container, light in weight, having a heat conductivity lower than 0.01 kcal/mh°C. and a mechanical strength sufficient for actual use, with almost no variations with time in the heat insulating property.

8 Claims, 5 Drawing Figures

COMPOSITE THERMAL INSULATOR

BACKGROUND OF THE INVENTION

The present invention generally relates to a thermal insulator and more particularly, to a composite thermal insulator utilizing evacuated powder insulation.

Conventionally, for thermal insulators, there have been known inorganic materials such as glass wool, asbestos, ceramic foam, calcium silicate, etc., and organic materials represented by expandable substances such as polystyrene, epoxy, polyurethane or the like, and these materials are employed for various applications such as heat insulating properties, heat resistance, mechanical strength, workability, economical aspect, etc.

Meanwhile, as low temperature heat insulators for refrigerators and the like, expandable materials such as polyethylene foam, expanded polystyrene, foam rubber, rigid polyurethane foam, phenol foam, etc. have been mainly employed, with heat conductivities in the range of 0.015 to 0.037 kcal/mh°C., but from the standpoint of energy conservation, insulating materials having still more favorable heat insulating properties have been required.

On the other hand, for cryogenic or ultra-low temperature heat insulating materials used, for example, for a liquid nitrogen tank or the like, expanded perlite powder subjected to evacuation to form a high vacuum lower than 0.01 Torr has been used, but in this case, a container in which the expanded perlite is filled must be made of a thick metallic material to withstand the high vacuum, and such a requirement presents an obstacle in the applications of the evacuated powder insulation to various commodities.

A thermal insulator constituted by filling a heat insulating material in a plastic container for subsequent evacuation to form a vacuum, has a heat conductivity less than 0.01 kcal/mh°C. to show a favorable heat insulating property, but since plastics are generally provided with a large air transmittance as compared with metallic materials, the heat insulating property thereof deteriorates with time. For reducing the air transmittance of plastics as described above, there has been conventionally proposed one method in which the plastic container is coated with an expanded resin, such as expanded polyurethane and the like, and a composite thermal insulator having such a construction is fully described, for example, in Japanese Laid Open Patent Specification Tokkaisho No. 57-96852. However, even in this prior art thermal insulator, there is still such a drawback that part of Freon (name used in trade and manufactured by Du Pont of the U.S.A.) gas used for expansion enters the interior of the plastic container, thus resulting in deterioration of the heat insulating property of the composite thermal insulator.

SUMMARY OF THE INVENTION

Accordingly, an essential object of the present invention is to provide an improved composite thermal insulator which includes a Freon gas expanded plastic, a film-like plastic container evacuated to form a vacuum in its interior and partly or entirely covered by the expanded plastic, and activated carbon or inorganic powder containing activated carbon tightly enclosed in the plastic container, and which has a mechanical strength sufficient for actual applications, with a heat conductivity of less than 0.01 kcal/mh°C., and is almost free from deterioration of the insulating property with time.

Another important object of the present invention is to provide a composite thermal insulator simple in construction, light in weight, and stable in functioning, and can be readily manufactured on a large scale at low cost.

In accomplishing these and other objects, according to one preferred embodiment of the present invention, there is provided a composite thermal insulator which includes a Freon gas expanded plastic, a film-like plastic container evacuated to form a vacuum in its interior directly contacting and/or covered by the expanded plastic, an activated carbon or inorganic powder containing activated carbon tightly enclosed in the plastic container. The composite thermal insulator of the present invention is light in weight, having the heat conductivity lower than 0.01 kcal/mh°C. and a mechanical strength sufficient for actual use, with almost no variation with time in the heat insulating property.

By the arrangement according to the present invention as described above, an improved composite thermal insulator has been advantageously presented, with substantial elimination of disadvantages inherent in the conventional composite thermal insulators of this kind.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
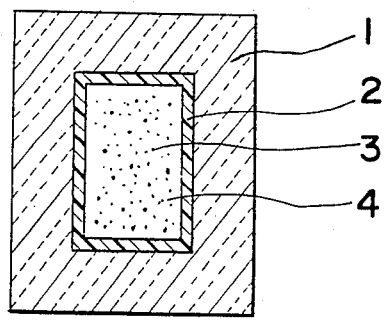
FIG. 1 is a schematic cross sectional view of a composite thermal insulator according to one preferred embodiment of the present invention.

Before the description of the present invention proceeds, it is to be noted that like parts are designated by like reference numerals throughout the accompanying drawings.

In the first place, it is to be noted that the present invention provides an improved composite thermal insulator which is constituted by a Freon gas expanded plastic, a film-like plastic container evacuated to form a vacuum in its interior and partly or entirely covered by the expanded plastic, an activated carbon or inorganic powder containing activated carbon tightly enclosed in said plastic container.

Moreover, in the composite thermal insulators of the above described type, (1) those employing activated carbon having an average particle diameter of less than 0.15 mm, (2) those using activated carbon processed by a steam activation process, (3) those in which the activated carbon is located in a boundary portion between the film-like plastic container and inorganic powder other than the activated carbon, and (4) those in which the activated carbon is used in a state where it is packed in a container having a gas permeability, are particularly superior in performance with respect to actual applications.

Referring now to the drawings, there is shown in FIG. 1 a fundamental construction of a composite thermal insulator according to one preferred embodiment of the present invention, which includes an expanded plastic 1, a film-like plastic container 2 evacuated to form a vacuum in its interior and partly or entirely covered by the expanded plastic 1, and activated carbon 3 or inorganic powder 4 containing activated carbon 3 tightly enclosed in the plastic container 2.

Figure 2:
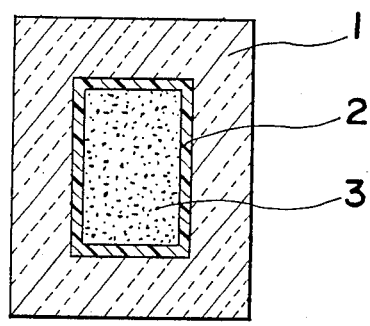
FIG. 2 is a view similar to FIG. 1, which particularly shows a second embodiment thereof, in which only activated carbon is filled in a film-like plastic container.
Figure 3:
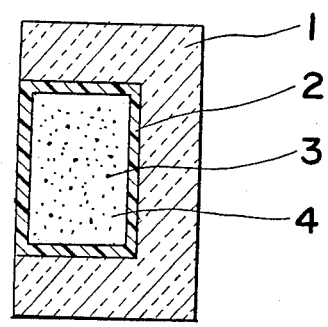
FIG. 3 is also a view similar to FIG. 1, which particularly shows a third embodiment thereof, in which only part of the film-like plastic container is covered by a Freon gas expanded plastic.

FIG. 1 represents the state in which the film-like plastic container 2 evacuated to form a vacuum in the interior thereof and sealed after being filled with the inorganic powder 4 containing activated carbon 3 is arranged to directly contact the expanded plastic 1 so as to be entirely covered by the expanded plastic 1, and FIG. 2 illustrates the state in which the film-like plastic container 2 evacuated to form a vacuum in its interior and sealed after being filled only with the activated carbon 3 is adapted to directly contact the expanded plastic 1 so as to be entirely covered by the plastic 1, while FIG. 3 shows the state in which the film-like plastic container 2 evacuated to form a vacuum in its interior and sealed after being filled with the inorganic powder 4 containing the activated carbon 3 is arranged to partly contact the expanded plastic 1.

For the expanded plastic 1, although there are available polyethylene foam, expanded polystyrene, phenol foam, rigid polyurethane foam, etc. which have been conventionally employed according to end uses, expanded plastics having independent foams expanded by Freon gas and a heat conductivity smaller than air are preferable as a heat insulating material, and among these expanded plastics as referred to above, the rigid polyurethane foam is particularly superior from such points that (1) it is possible to expand at the site, (2) heat conductivity is small, and (3) strength sufficient for practical applications is available, etc. It is to be noted that the expanded plastic 1 should have not only a superior heat insulating performance, but also function to protect the film-like plastic container 2.

For the film-like plastic container 2, there is no particular limitation in the quality of material, and there may be employed, for example, single layered films or laminated films, etc. of polyethylene, nylon, polyvinyl alcohol, polyester, polypropylene, polyvinylidene chloride and the like. Needless to say that part of the film-like plastic 2 may be replaced by a composite material laminated with a metallic thin film or by a film-like plastic deposited with a metallic material.

The activated carbon 3 has a function to adsorb expansion gas permeating through the film-like plastic 2 and present in the expanded plastic 1. In the case where Freon gas having molecular diameters thereof in the range of from several to 20 Å or thereabout is employed, the Freon gas molecules are condensed into micropores within the activated carbon so as to be adsorbed thereto. Accordingly, for the activated carbon 3, any sort of activated carbon may be employed so long as it adsorbs Freon gas, but activated carbon including micropores having pore diameters smaller than about 50 Å, at a higher rate is particularly suitable. In general, as compared with the activated carbon processed by the chemical activation process, the activated carbon processed by the steam activation process contains micropores having diameters smaller than 50 Å at a high rate. and is as superior as the activated carbon 3 to be used for the composite thermal insulator according to the present invention. Furthermore, the steam activated carbon has a high ignition temperature as compared with that of the chemically activated carbon, and is extremely safe in the drying of the activated carbon.

In the absence of any restriction with respect to the amount of use of the activated carbon, activated carbon processed by the chemical activation process or steam activation process may be employed.

In the case of the composite thermal insulator in which only the activated carbon 3 is filled in the film-like plastic container 2, it is preferable that the activated carbon 3 have an average particle diameter smaller than 0.15 mm in order that the composite thermal insulator according to the present invention should show superior heat conductivity lower than 0.01 kcal/mh°C. In general, the tendency is such that the smaller the particle diameter of the activated carbon 3, the lower is the heat conductivity of the composite thermal insulator according to the present invention, as represented by FIG. 2.

Meanwhile, in the composite thermal insulator as shown in FIG. 1 in which the inorganic powder 4 containing the activated carbon 3 is filled within the film-like plastic container 2, although there is no particular limitation in the manner in which the activated carbon is packed, it is recommended to dispose the activated carbon 3 at a boundary portion between the film-like plastic container 2 and the inorganic powder 4 other than the activated carbon, from such viewpoints that (1) less energy is required for drying, since the activated carbon 3 and the inorganic powder 4 may be dried separately, and (2) handling is much facilitated, etc. In the above case, the activated carbon 3 may be disposed as it is without being accommodated in a bag or the like, at the boundary portion between the plastic container 2 and the inorganic powder 4 other than the activated carbon, but in actual application, it is more advantageous to dispose the activated carbon 3 at the boundary portion between the plastic container 2 and the inorganic powder 4 other than the activated carbon, the activated carbon 3 prepared by such methods as accommodation of the activated carbon in a container with a favorable gas permeability, or forming the activated carbon into a flat plate-like configuration, or dispersion of the activated carbon in a substance having a gas permeability and a low heat conductivity such as a filter paper, aggregate of fibers or the like.

With respect to the ratio of addition of the activated carbon 3 which may be described more in detail later with reference to the Examples of the present invention, this will largely differ depending on a property as a gas barrier determined by the material for the film-like plastic container 2, and the configurations of the plastic container 2.

For the inorganic powder 4, diatomaceous earth. silica, magnesium carbonate, etc. in a powder form, and perlite, microballoon, etc. in a hollow spherical powder form are suitable. Although the inorganic powder 4 may be replaced by inorganic fibers such as glass fibers, asbestos, or expanded material such as expanded plastic, or an aggregate of organic fibers to obtain a composite thermal insulator having a superior performance, such materials are less advantageous in cost than the inorganic powder for the composite thermal insulator. The activated carbon itself has an effect to suppress undesirable radiation of heat, but needless to say other substances such as aluminum powder, copper powder, carbon black, etc. may further be added to the inorganic powder 4, depending on necessity.

Hereinbelow, Examples are inserted for the purpose of describing the present invention in detail with reference to the accompanying drawings, without any intention of limiting the scope thereof.

EXAMPLE 1

Activated carbons Y6, Y12, Y24 and Y48 (name used in trade and manufactured by Hitachi Tansokogyo Kabushiki Kaisha, Japan) were subjected to classification by a sieve to obtain activated carbons represented by A, B, C, D, E, F and G and respectively having different particle size distributions. Average particle diameters of the respective activated carbons (50 wt% diameter under cumulative sieving) were generally as shown in Table 1 below.

TABLE 1

| Kind of activated carbon | Average particle diameter (mm) |
| --- | --- |
| A | 2.38 |
| B | 1.00 |
| C | 0.71 |
| D | 0.297 |
| E | 0.149 |
| F | 0.100 |
| G | 0.053 |

Subsequently, 500 g of the activated carbon A was filled in a bag of kraft paper for heating and drying in a vacuum state for 12 hours at 120° C. Thereafter, the bag thus processed was accommodated in a container made of a laminated film of polyethylene.aluminum-deposited polyvinyl alcohol.polypropylene, and the opening of the film container was subjected to heat fusion under a vacuum state of 0.1 Torr through employment of a vacuum packing machine, and thus, a thermal insulator A measuring 250 mm×250 mm×25 mm was obtained. In the next step, the thermal insulator A thus prepared was placed in a pressure vessel having a space measuring 300 mm×300 mm×50 mm, while two-liquid mixed type expanded polyurethane was subjected to "foaming-in-place" with Freon-11 ($CFCl_3$) gas so that the surface of the thermal insulator was covered by expanded polyurethane in approximately equal thickness, and thus, the composite thermal insulator A of the present invention was obtained. The activated carbons B, C, D, E, F and G were processed in the similar manner so as to prepare composite thermal insulators B, C, D, E, F and G respectively. In the above particle diameter range, since the volume or bulk density of the activated carbon is reduced as the average particle diameter is decreased, the charge amount thereof was so adjusted that the thickness of the thermal insulator becomes 25 mm, with respect to the respective activated carbons. After cooling, the composite thermal insulators A, B, C, D, E, F and G were measured for heat conductivities at room temperature, with resultant values as shown in Table 2 below.

TABLE 2

| Kind of composite thermal insulator | Heat conductivity [kcal/mh °C.] |
| --- | --- |
| A | 0.0130 |
| B | 0.0121 |
| C | 0.0113 |
| D | 0.0107 |
| E | 0.0092 |
| F | 0.0088 |
| G | 0.0084 |

For the measurements of the heat conductivities, a K-matic heat conductivity measuring apparatus (manufactured by Dynatech R/D company, U.S.A.) was employed, and the measurements were taken based on the method of ASTM (American society for testing & Materials)-C518, with one surface of the composite thermal insulator being set at 35° C. and the other surface thereof set at 13° C.

As is clear from Table 2, the composite thermal insulator according to the present invention, which includes the Freon gas expanded plastic, the film-like plastic container evacuated to form a vacuum in the interior thereof and partly or entirely covered by said expanded plastic, and the activated carbon tightly enclosed within said plastic container, is capable of having heat conductivity lower than 0.01 kcal/mh°C., and is very useful for actual applications. Moreover, as is seen from Table 2, it is preferable that the average particle diameter of the activated carbon is smaller than 0.15 mm in order that the composite thermal insulator according to the present invention shows a superior heat conductivity lower than 0.01 kcal/mh°C.

In Example 1 as described above, the activated carbon also has such a function as to adsorb Freon gas in the expanded polyurethane, which penetrates through the film-like plastic container for effectively suppressing the rise in the heat conductivity of the composite thermal insulator following an increase of the internal pressure resulting from entry of Freon gas into said film-like plastic container.

EXAMPLE 2

Except for employment of 360 g of Carborafin-6 (average particle diameter 47 microns, name used in trade for chemically activated carbon manufactured by Takeda Chemical Industries, Ltd, Japan), another composite thermal insulator H was prepared in exactly the same manner as in Example 1.

Subsequently, the above composite thermal insulator H thus prepared was left to stand in a closed vessel in the Freon-11 ($CFCl_3$) gas atmosphere under one atmospheric pressure at 60° C., while being taken out from time to time to measure the heat conductivity for investigation into variation with time of the heat conductivity.

Meanwhile, for obtaining comparative data, a composite thermal insulator I prepared in the similar manner and conditions as those for the thermal insulator H, with the activated carbon being replaced by powder of expanded perlite #419 (average particle diameter 3 microns, name used in trade and manufactured by Dicalite Orient Co., Ltd, Japan), was also left to stand in the similar closed vessel in the Freon-11 gas atmosphere under one atmospheric pressure at 60° C. for the evaluation of variation with time of the heat conductivity.

Figure 4:
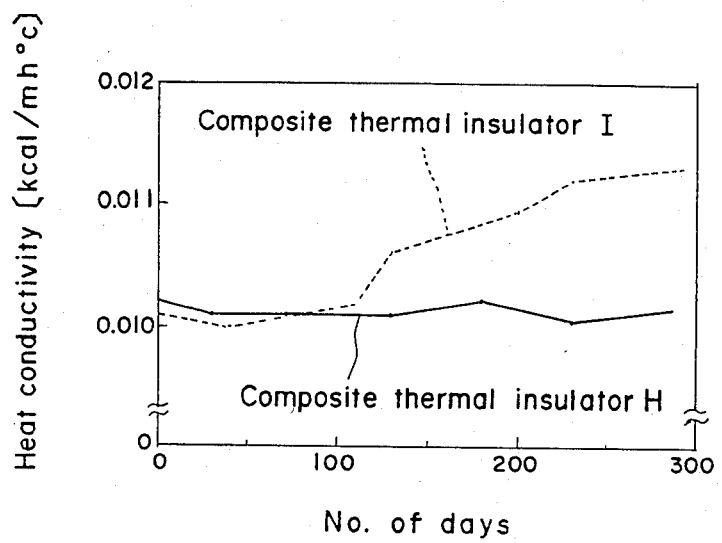
FIGS. 4 and 5 are characteristic diagrams showing variations of heat conductivities with time of the composite thermal insulators H and J according to the present invention in an atmosphere of Freon-11 (CFCl$_3$) gas under one atmospheric pressure at 60° C.

FIG. 4 is a graph showing comparison of variations with time of heat conductivities between the composite thermal insulator H (solid line) according to the present invention and the composite thermal insulator I (dotted line) not containing activated carbon, in the atmosphere of Freon-11 gas under one atmospheric pressure at 60° C.

As is seen from FIG. 2, according to the composite thermal insulator of the present invention, it is possible to effectively suppress the deterioration in the heat insulating property due to reduction of the degree of vacuum in the film-like plastic container resulting from entry of Freon gas into the plastic container from the interior of the expanded plastic, and thus the composite thermal insulator of the present invention is extremely useful for actual applications.

EXAMPLE 3

Carborafin-6 (Referred to earlier), and shirasagi A (activated carbon processed by the steam activation process, name used in trade and manufactured by Takeda Chemical Industries, Ltd. Japan) were respectively dried in the vacuum heating and drying apparatus at 150° C. for 5 hours and thereafter, were measured for the respective specific surface areas by a BET method surface area measuring apparatus P-700 (manufactured by Shibata Kagaku Kikai Kogyo Co., Ltd. Japan).

Subsequently, after a sufficient degassing, the amount of adsorption of Freon-11 (CFCl$_3$) gas onto the activated carbon at room temperature under a state of a low vacuum was measured, with finding as shown in Table 3 below.

TABLE 3

| Kind of activated carbon | Specific Surface area (m$^2$/g) | Freon-11 gas adsorption pressure(Torr) | Amount of Freon-11 gas adsorbed by activated carbon of 1 g (ml:NTP) |
| --- | --- | --- | --- |
| Carborafin-6 | 1000 | 1.0 | 8.2 |
|  |  | 3.2 | 13.1 |
|  |  | 9.0 | 27.3 |
|  |  | 25.0 | 44.3 |
| Shirasagi A | 1200 | 1.2 | 14.5 |
|  |  | 4.0 | 20.2 |
|  |  | 11.2 | 24.3 |
|  |  | 30.1 | 26.9 |

As is seen from Table 3, in the degree of vacuum applicable to the composite thermal insulator according to the present invention, the activated carbon processed by the steam activation process has a larger capacity for adsorbing Freon-11 gas than the activated carbon processed by the chemical activation process, thus being highly useful for actual applications.

In Example 3, although activated carbon dried for 5 hours at 150° C. in the vacuum heating and drying apparatus was employed, the amount of Freon gas to be adsorbed depends largely on such treating method. By way of example, the Freon gas adsorbing amount of the activated carbon heated and dried in air at 200° C. for 5 hours was about 80% of the values shown in Table 3.

EXAMPLE 4

300 g of expanded perlite powder #419 (referred to earlier) and 0.5 g of shirasagi A (referred to earlier) as employed in Example 2, were uniformly mixed and filled in a bag of kraft paper for subsequent heating and drying in a vacuum state for 12 hours at 120° C. Thereafter, the bag thus processed was accommodated in a container made of a laminated film of polyethylene.-polyvinyl alcohol.polypropylene, and the opening of the film container was subjected to heat fusion under a vacuum state of 0.1 Torr through employment of a vacuum packing machine, and thus, a thermal insulator measuring 250 mm×250 mm×25 mm was obtained. In the next step, the thermal insulator thus prepared was placed in a pressure vessel having a space measuring 300 mm×300 mm×50 mm, while two-liquid mixed type expanded polyurethane was subjected to "foaming-in-place" with Freon-11 (CFCl$_3$) gas so that the surface of said thermal insulator was covered by expanded polyurethane in approximately equal thickness.

Subsequently, the composite thermal insulator J prepared in the manner as described in the foregoing was taken out from the pressure vessel, and was left to stand in a closed vessel in the atmosphere of Freon-11 (CFCl$_3$) gas under one atmospheric pressure at 60° C. for investigation into variation with time of the heat conductivity. Meanwhile, for obtaining comparative data, another composite thermal insulator K prepared in the same manner as above except that the activated carbon shirasagi A was replaced by shirasagi E-16 (name used in trade for chemically activated carbon manufactured by Takeda Chemical Industries, Ltd. Japan) was left to stand in the same closed vessel in the Freon-11 (CFCl$_3$) gas atmosphere under one atmospheric pressure at 60° C. for study of variation with time of the heat conductivity. In the above case, the heat conductivities were measured in the method similar to that in Example 1.

Figure 5:
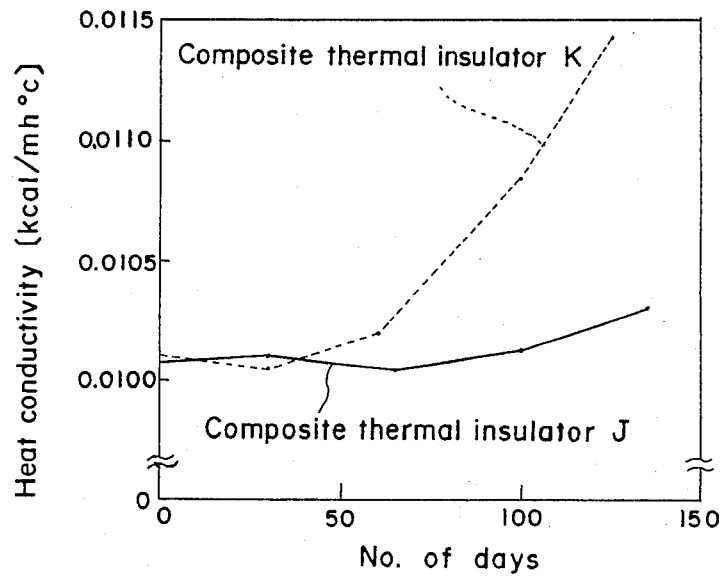

FIG. 5 is a graph showing comparison of variation with time of heat conductivities in a Freon-11 (CFCl$_3$) gas atmosphere under one atmospheric pressure at 60° C. between the composite thermal insulator J (solid lines) including the activated carbon "Shirasagi A" processed by the steam activation process and the composite thermal insulator K (dotted lines) including the activated carbon "Shirasagi E-16" processed by the chemical activation process.

As is seen from FIG. 5, the composite thermal insulator according to the present invention which employs the activated carbon processed by the steam activation process is capable of suppressing the deterioration of the heat insulating property due to reduction in the vacuum degree arising from flowing of Freon gas into the film-like plastic container, over a much longer period than that in the composite thermal insulator employing the activated carbon processed by the chemical activation process.

It should be noted here that, in Example 4 as described above, although the activated carbon is uniformly mixed into the expanded perlite powder for use, there is no particular difference in the Freon gas adsorbing capacity of the activated carbon, even when the activated carbon and expanded perlite powder are filled in separate bags having a gas permeability for the application to the composite thermal insulator.

EXAMPLE 5

300 g of expanded perlite powder #419 (referred to earlier) similar to that as employed in Example 2 were filled in a bag of kraft paper for heating and drying in a vacuum state for 12 hours at 120° C. The bag containing the expanded perlite powder thus processed was sandwiched between two bags also made of kraft paper (measuring 230 mm×230 mm×0.3 mm) and each containing 2.5 g of sufficiently dried Carborafin-6 (referred to earlier), and the bags thus prepared were accommodated in a container made of a laminated film of polyethylene.aluminum-deposited polyvinyl alcohol.polypropylene, and the opening of the film container was subjected to heat fusion under a vacuum state of 0.1 Torr through employment of a vacuum packing machine, and thus, a thermal insulator measuring 250 mm×250 mm×25 mm was prepared, with subsequent surrounding thereof by expanded polyurethane in the similar manner as in Example 1 to obtain a composite thermal insulator L. Upon measurement of heat conductivity in the similar manner as in Example 1, the heat conductivity of said composite thermal insulator L at room temperature was 0.0102 kcal/mh°C. In Example 5, handling of the activated carbon was remarkably facilitated from the view points of drying, addition, etc. of the activated carbon, as compared with the case in which the activated carbon was dispersed in the expanded perlite powder.

It should be noted here that in Example 5, although the activated carbon was described to be packed in the two bags of kraft paper (each measuring 230 mm×230 mm×0.3 mm), the material, dimensions and number of the bags are not limited thereby, but may be varied in various ways within the scope depending on necessity.

EXAMPLE 6

Except for employment of 33 g of a filter paper G70 containing activated carbon (name used in trade and manufactured by Whatman Ltd., England) as the activated carbon a composite thermal insulator M was prepared in exactly the same manner as in Example 5. Upon measurement of the heat conductivity at room temperature, the composite thermal insulator M had the heat conductivity of 0.010 kcal/mh°C.

EXAMPLE 7

1.0 g of BCW 32/100 (name used in trade for activated carbon of coconut shells activated by steam and manufactured by Fujisawa Pharmaceutical Company Limited, Japan) packed in one bag made of polyester non-waven fabric was employed as the activated carbon, while said bag was disposed between a bag of kraft paper filled with 300 g of expanded perlite powder #419 (referred to earlier) and a film-like plastic container made of a laminated film of polyethylene.aluminum deposited polyvinyl alcohol.polypropylene, and processed in exactly the same method as in Example 5 except for the above arrangement so as to obtain a composite thermal insulator N. Moreover, there was also prepared another composite thermal insulator O having exactly the same structure as the composite thermal insulator N except that it contains no activated carbon.

Subsequently, the composite thermal insulators N and O thus prepared were left to stand in the same closed vessel having Freon-11 (CFCl₃) gas atmosphere under one atmospheric pressure at 25° C. for comparison of variations with time of respective heat conductivities. Table 4 below shows the heat conductivities at an initial stage and after one year at room temperature for comparison.

TABLE 4

| Composite thermal insulator | Heat conductivity (kcal/mh °C.) | |
| --- | --- | --- |
|  | Initial stage | After one year |
| N | 0.0085 | 0.0088 |
| O | 0.0087 | 0.0116 |

As is clear from Table 4, the composite thermal insulator according to the present invention is capable of maintaining a superior heat insulating property over a long period, and extremely useful for practical applications.

In Example 7, although 1.0 g of activated carbon was added to 300 g of expanded perlite powder, the ratio of the activated carbon should be increased in cases where the low heat conductivity is to be maintained for a longer period or where the thickness of the film-like plastic container is thin.

For further suppressing the transmission of Freon gas through the film-like plastic container, the aluminum deposited polyvinyl alcohol layer for the film-like plastic container should be replaced by a layer having a high gas barring property such as an aluminum foil, nylon layer or the like, in which case, the amount of activated carbon to be used is decreased.

It is to be also noted that, in the foregoing embodiments of the composite thermal insulator according to the present invention, although the thickness of Freon gas expanded plastic and that of the film-like plastic container are adapted to be approximately the same, the heat conductivity of the composite thermal insulator is naturally decreased as the thickness of the latter is increased.

As is clear from the foregoing description, the composite thermal insulator according to the present invention includes the Freon gas expanded plastic, the film-like plastic container evacuated to form a vacuum state in the interior thereof and directly contacting and/or covered by said expanded plastic, and the activated carbon or inorganic powder containing activated carbon tightly enclosed within said plastic container, and is light in weight, having the heat conductivity lower than 0.01 kcal/mh°C. and a mechanical strength sufficient for actual use with almost no variation with time in the heat insulating property, thus being extremely useful for actual applications.

Although the present invention has been fully described by way of examples with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A composite thermal insulator which comprises an expanded plastic, a film-like plastic container evacuated to form a vacuum in its interior and partly or entirely covered by said expanded plastic, and activated carbon tightly enclosed within said plastic container.

2. A composite thermal insulator as claimed in claim 1, wherein said expanded plastic is expanded by Freon gas.

3. A composite thermal insulator as claimed in claim 1, wherein said activated carbon has an average particle diameter smaller than 0.15 mm.

4. A composite thermal insulator as claimed in claim 1, wherein said activated carbon is activated by a steam activation process.

5. A composite thermal insulator which comprises a Freon gas expanded plastic, a film-like plastic container evacuated to form a vacuum in its interior and partly or entirely covered by said expanded plastic, and inorganic powder containing activated carbon sufficient in amount at least to adsorb Freon gas thereto and tightly enclosed within said plastic container.

6. A composite thermal insulator as claimed in claim 5, wherein said activated carbon is one activated by a steam activation process.

7. A composite thermal insulator as claimed in claim 5, wherein said activated carbon is present at a boundary portion between said film-like plastic container and inorganic powder other than the activated carbon.

8. A composite thermal insulator as claimed in claim 5, wherein said activated carbon is packed in a container having a gas permeability.

* * * * *